(12) United States Patent
Ku

(10) Patent No.: US 6,332,236 B1
(45) Date of Patent: Dec. 25, 2001

(54) WINDSHIELD WIPER ARM CONNECTOR

(76) Inventor: Shu-Lan Ku, 2F, No. 118-11, Ming An W. Rd., Hsinchuang City, Taipei Hsien (TW)

( * ) Notice: Subject to any disclaimer, the term of this patent is extended or adjusted under 35 U.S.C. 154(b) by 0 days.

(21) Appl. No.: 09/790,562

(22) Filed: Feb. 23, 2001

(51) Int. Cl.⁷ ...................................................... B60S 1/40
(52) U.S. Cl. ........................ 15/250.32; 403/321; 403/329
(58) Field of Search ........................... 15/250.32, 250.31, 15/250.361; 403/321, 3, 4, 326, 329

(56) References Cited

U.S. PATENT DOCUMENTS

| 5,289,608 | * | 3/1994 | Kim ................................... 15/250.32 |
| 5,611,103 | * | 3/1997 | Lee ................................... 15/250.32 |
| 5,937,474 | * | 8/1999 | Hussaini ............................. 15/250.32 |

FOREIGN PATENT DOCUMENTS

2119637 * 4/1982 (GB) ................................. 15/250.32

* cited by examiner

*Primary Examiner*—Gary K. Graham
(74) *Attorney, Agent, or Firm*—Rabin & Berdo, P.C.

(57) ABSTRACT

There is a joining slot under the connector, which matches the joining shaft of the framework. And there is also a socket in one end of the connector for a flat swing bar to be fixed in the connector. And in the other end of the connector is an inner fastening slot and an outer one, which is designed for the swing bar with a hook end to be fixed in the connector. Besides, there is an arc socket under the arc transverse part, with an active bolt, the swing bar with fixed jack can be connected and fixed. Because of the above-mentioned structure, the connector matches swing bars of different types to be fixed in the windshield wiper framework, and so it has great flexibility for use.

1 Claim, 14 Drawing Sheets

WINDSHIELD WIPER ARM CONNECTOR

BACKGROUND OF THE INVENTION

1. Field of the Invention

The present invention relates to a windshield wiper arm connector, more particularly, to a connector capable of connecting different type of wiper arms including a flat-end, a hook-end or a pin-end type wiper arm to a windshield wiper framework.

2. Description of the Prior Art

Driving on the rainy days, drivers could not see very clearly if there is no windshield wipers.

FIGS. 9 and 10 show a conventional windshield wiper with the flat-end type wiper arm. At the end of the windshield wiper arm (a) a driving mechanism is fixed to the windshield wiper framework (c) through a connector (b). There is a connecting shaft (c1) in the wiper framework (c) and a fastening slot (b1) in the connector (b), so the connector can be fixed to the wiper framework (c) though the fastening slot (b1) biting the connecting shaft (c1). Further, there is an inserting slot (b2) in one end of the connector (b), and there is a spring slice (b3) under the slot (b2) and a positioning socket (b4) upon the slot (b2). The end of the wiper arm (a) is flat with a projecting point (a1) thereon, with which the wiper arm (a) can be inserted into the inserting slot (b2) of the connector (b) while the projecting point (a1) is pushed upward to the positioning socket (b4) by the spring slice (b4).

FIGS. 11 and 12 show another conventional windshield wiper of the hook-end type. A U-shaped clip connector (d) has a fastening slot (d1). The clip connector (d) can be fastened to the connecting shaft (c1) of the wiper framework (c) by the fastening slot (d1). The end of the wiper arm (a) forms a hook (a2) to hook the U-shaped clip connector (d) so that the wiper arm (a) is connected to the wiper framework (c).

As shown in FIGS. 13 and 14, the connector (e) includes a bolt or pin (f) and two fastening slots (e1) and (e2). For assembly, the pin hole (a3) of the wiper arm (a) is put into the rear portion of the connector (e) and the fastening slot (e1) bites the connecting shaft (c1) of the wiper framework (c). So, after the bolt (f) is inserted through the drillings (c2) of the wiper framework (c), the fastening slot (e2) and the pin hole (a3), the wiper arm (a) is connected to the wiper framework (c).

As mentioned above, the wiper arms can have different ends according to the types of different cars. When the windshield wiper is useless and has to be changed, different connectors (b), (d) or (e) have to be chosen to match the right type of the wiper arm (a) for connecting to the wiper framework (c). So, many windshield wiper producers have to manufacture different types of connectors. It is inconvenient for production and will have a higher cost. Further, it is a great trouble for a user to find a suitable connector for maintenance.

SUMMARY OF THE INVENTION

Considering the above-mentioned disadvantages of the traditional way for using different connectors to connect the windshield wiper framework to different types of wiper arms, the applicant designed a novel connector for solving this problem.

It is therefore a primary object of the present invention to provide a connector that provides great flexibilities for connecting different types of windshield wiper arms such as a flat-end, a hook- end or a pin-end one.

BRIEF DESCRIPTION OF THE DRAWINGS

The accomplishment of the above-mentioned object of the present invention will become apparent from the following description and its accompanying drawings which disclose an illustrative embodiment of the present invention, and are as follows.

DETAILED DESCRIPTION OF THE PREFERRED EMBODIMENT

Figure 1:
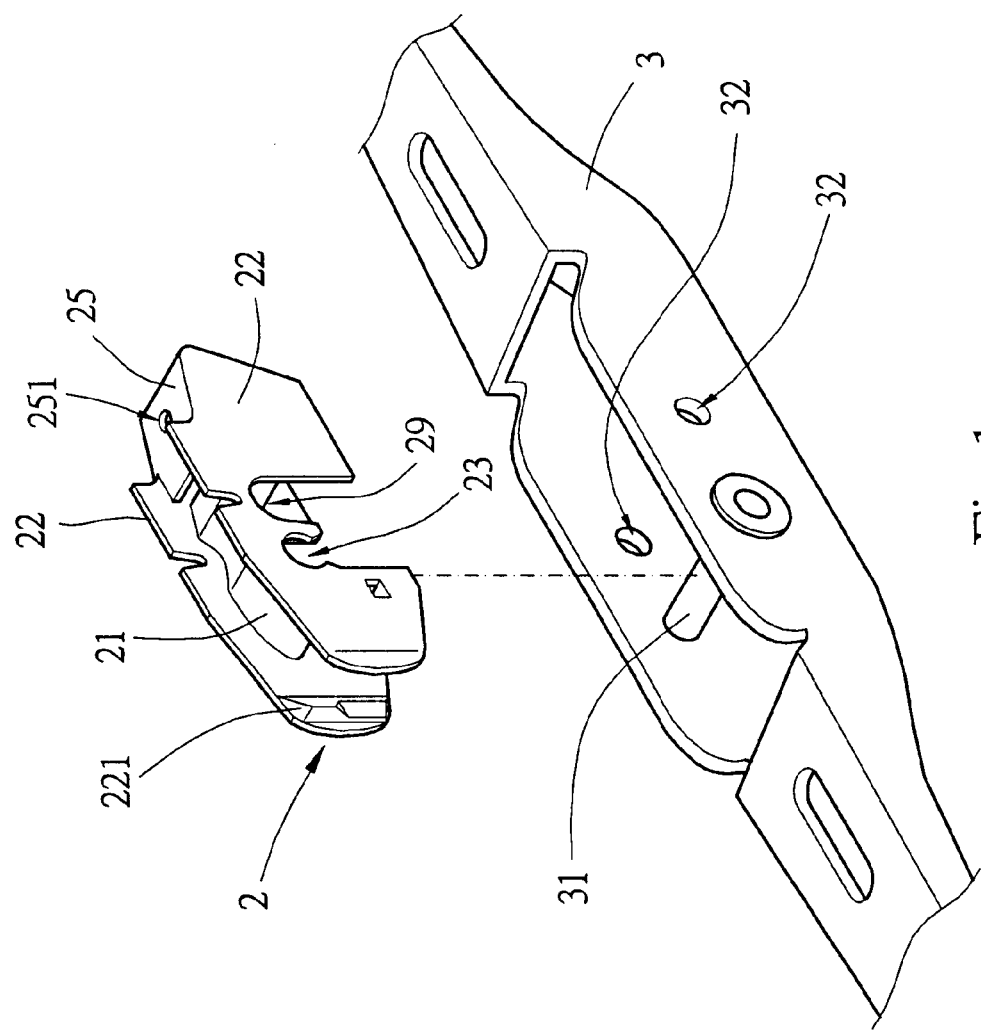
FIG. 1 is a perspective view of assembling the invention.
Figure 2:
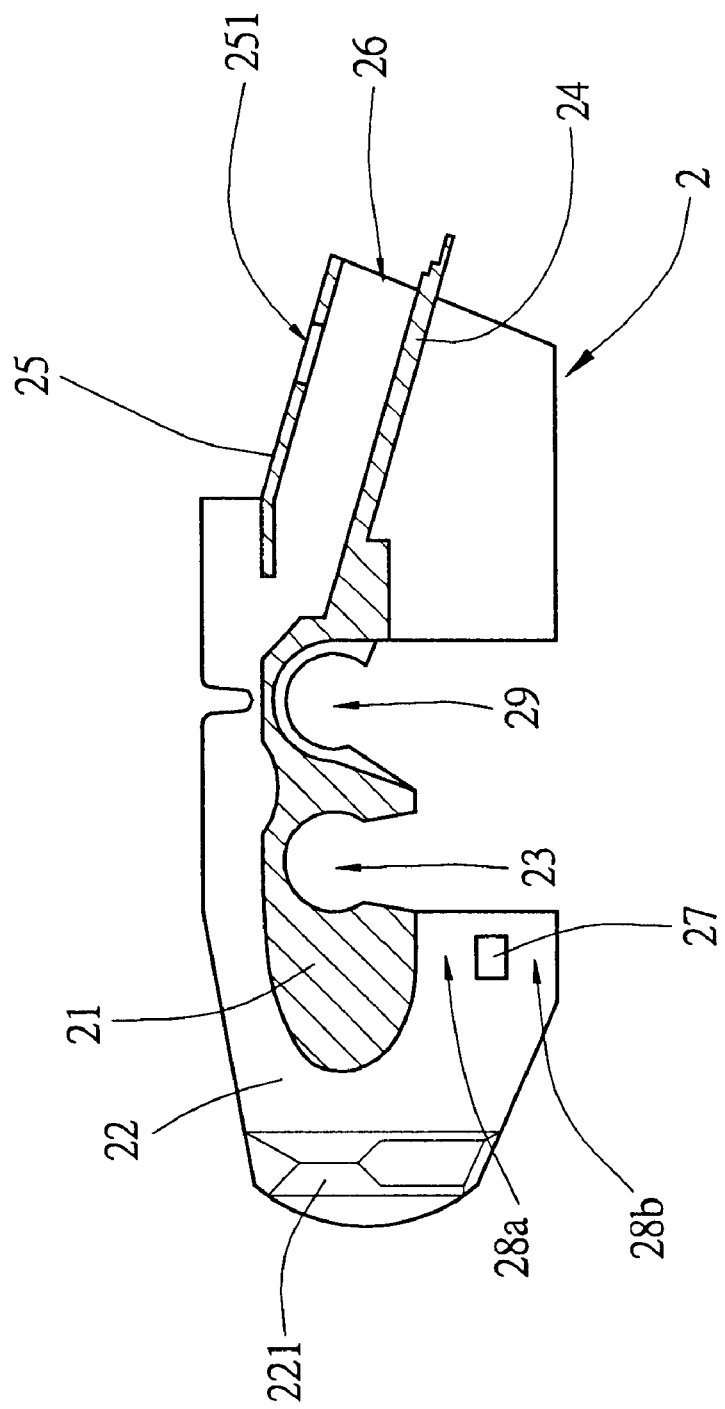
FIG. 2 is a cutaway view figure of the invention.

Referring to FIGS. 1 and 2, in the present invention, the end of the windshield wiper arm (not shown) is connected to the windshield wiper framework 3 by a connector 2. The wiper framework 3 includes a connecting shaft 31 and two opposite through holes 32. The connector 2 is fastened to the connecting shaft 31 of the wiper framework 3. The characteristics of the invention are as follows.

Figure 3:
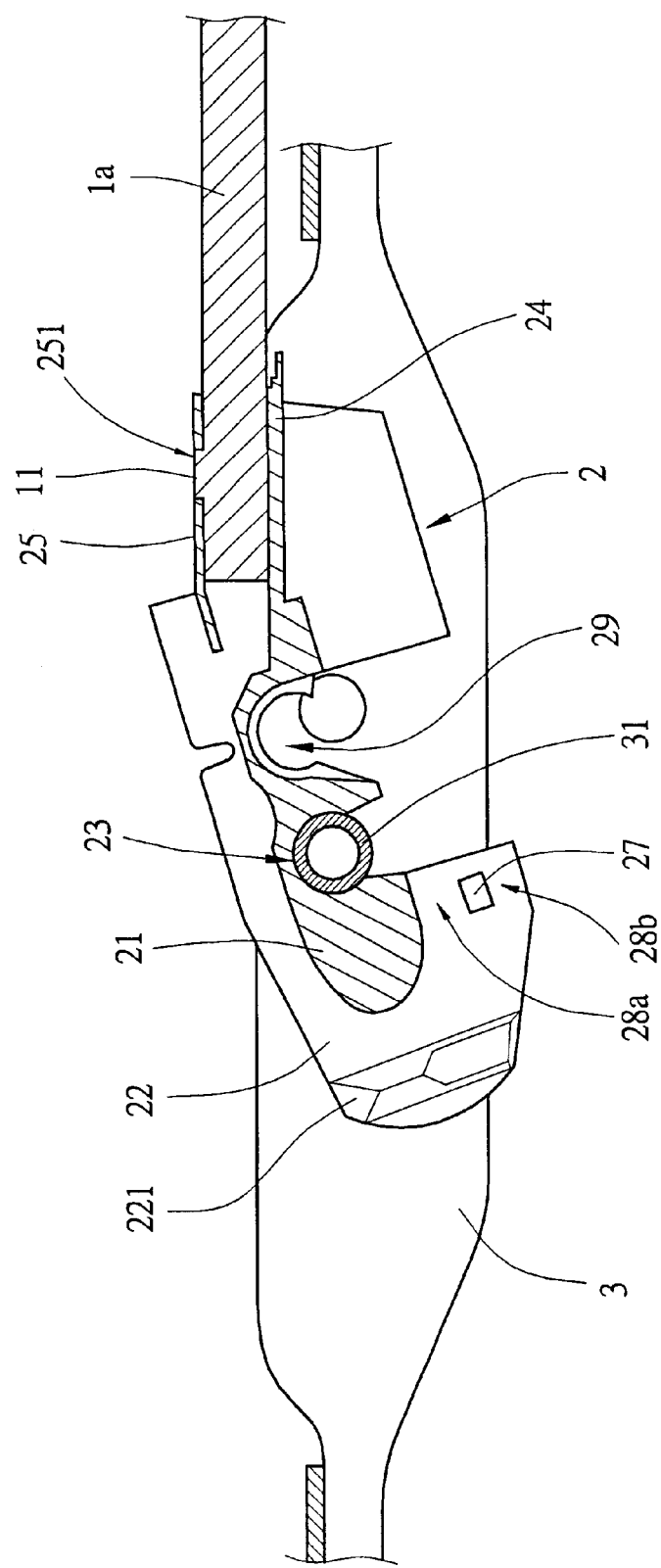
FIG. 3 is a cutaway view figure of a flat swing bar by the invention connector.

The connector 2 includes a side sheet 22 on either side of the arced transverse part 21, and a fastening slot 23 below the transverse part 21. The connector 2 can be fastened to the connecting shaft 31 of the framework 3 with the fastening slot 23. Further, there is a spring slice 24 between the two side sheets 22 at one end of the arced transverse part 21, and there is a structure slice 25 between the two side sheets 22 above the spring slice 24, so between the spring slice 24 and structure slice 25 forms an inserting socket 26. There is a positioning hole 251 in the structure slice 25 for receiving the projecting point 11 of the flat-end wiper arm 1a (as shown in FIG. 3) inserted into the socket 26. In this way, the present connector can be suitable for the flat-end type wiper arm.

Figure 4:
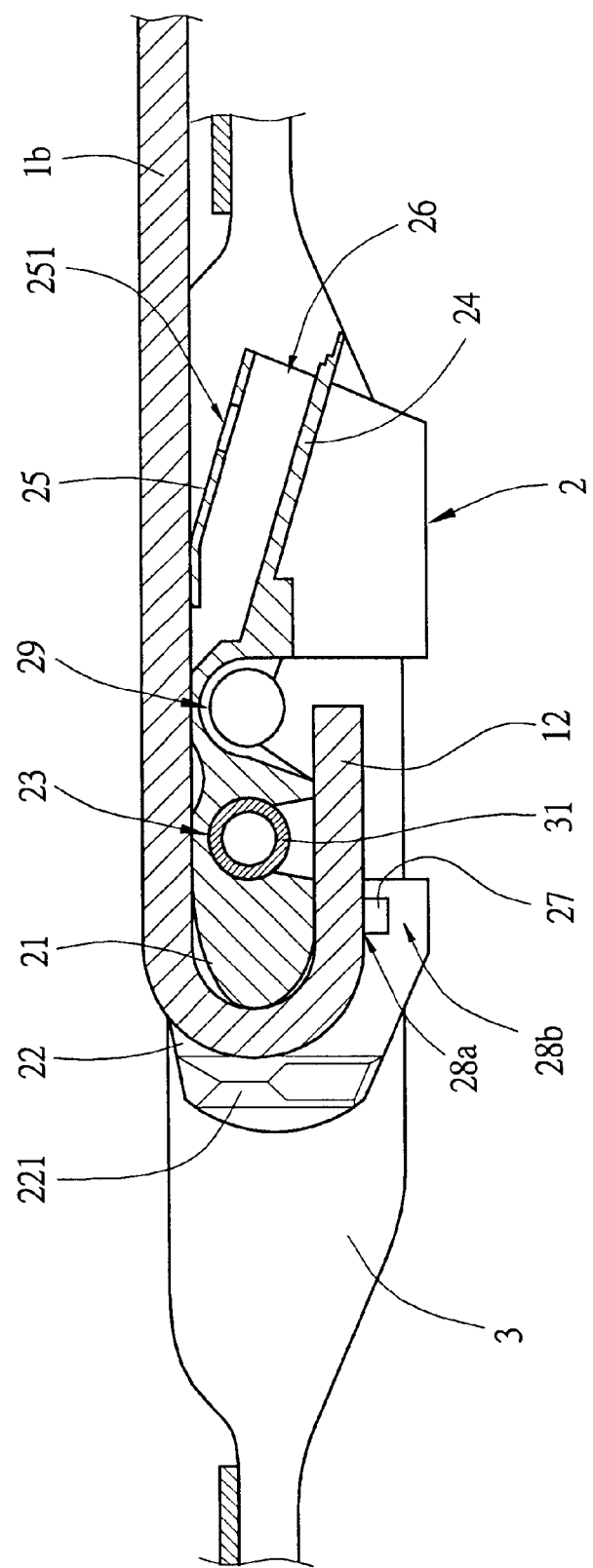
FIG. 4 is a cutaway view figure of a swing bar with a hook end by the inner fastening slot of the invention connector.
Figure 5:
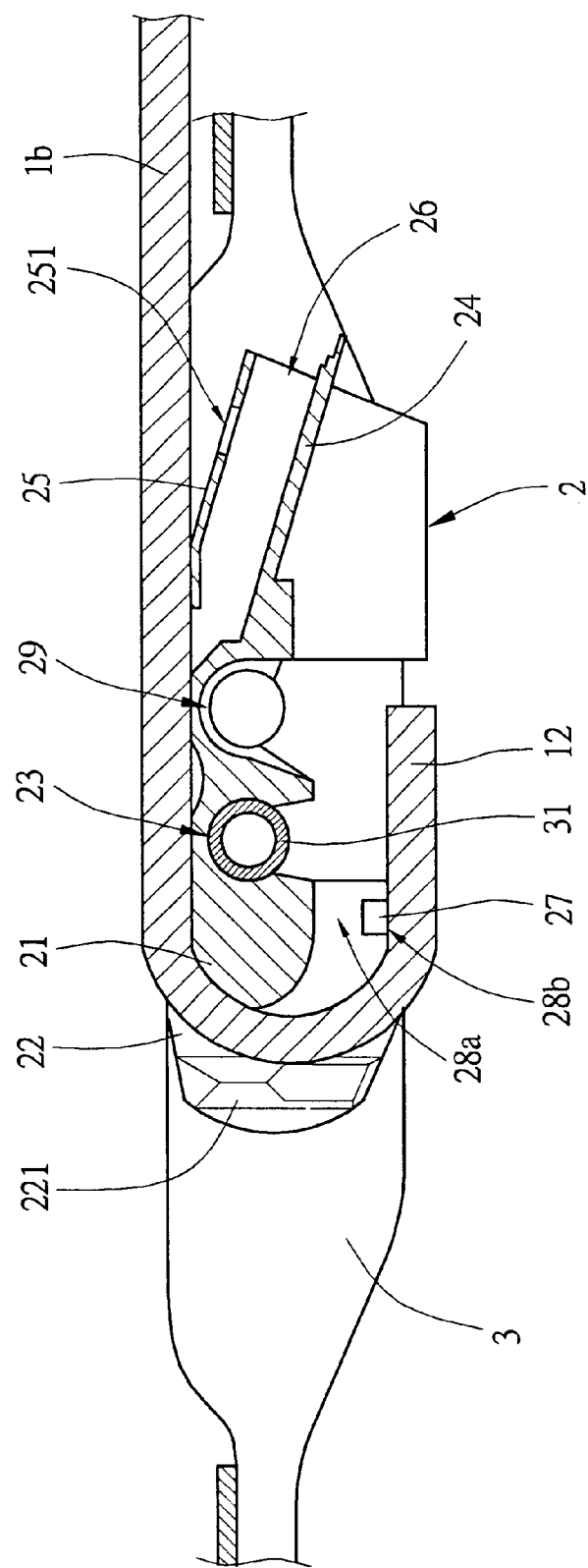
FIG. 5 is a cutaway view figure of a swing bar with a hook end by the outer fastening slot of the invention connector.
Figure 6:
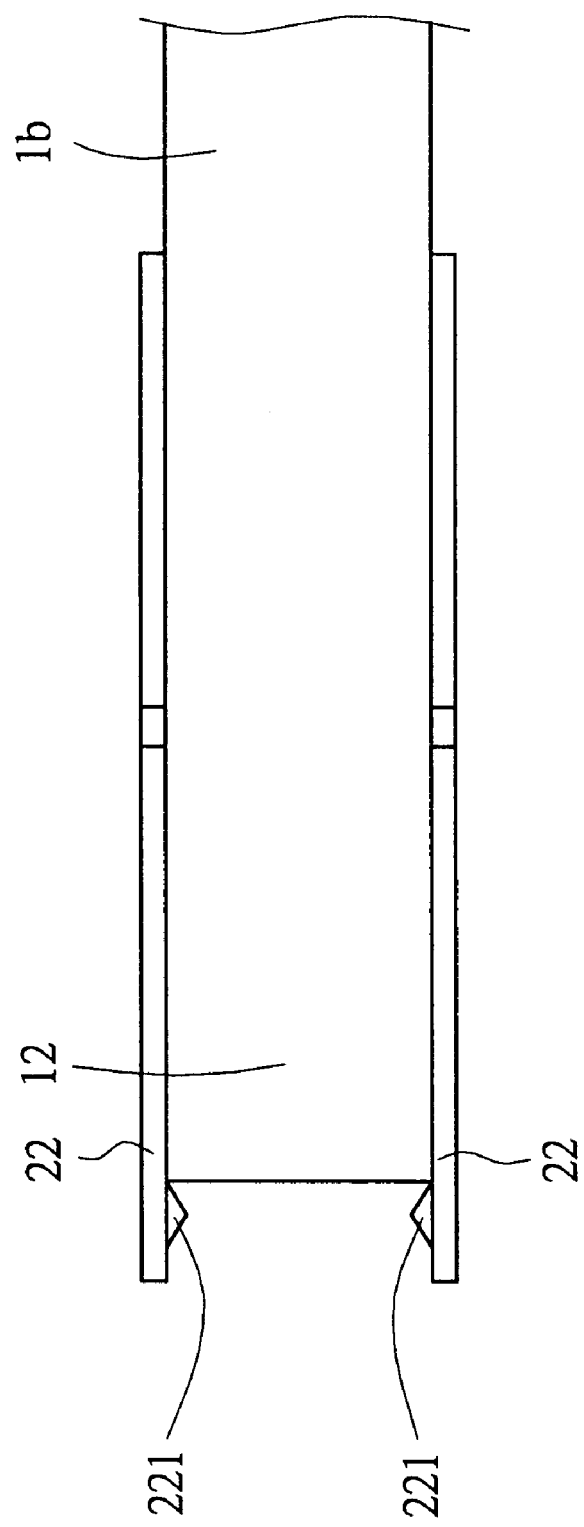
FIG. 6 is a top view figure of a swing bar with a hook end by the invention connector.

Referring to FIGS. 4 and 5, there is a projecting block 27 in each side sheet 22 and a baffle slice 221 in the inner side of each front side sheet 22. Between the two projecting blocks 27 and the arced transverse part 21 forms an inner fastening slot 28a and outside the two projecting block 27 forms an outer fastening slot 28b. Thus the wiper arm 1b with different sized hook end 12 can be hooked on the arced transverse part 21 in the inner slot 28a or outer slot 28b. Further with the baffle slice 221 against outside the hook end 12, as shown in FIG. 6, the present connector can be also suitable for the hook-end type wiper arm.

Figure 7:
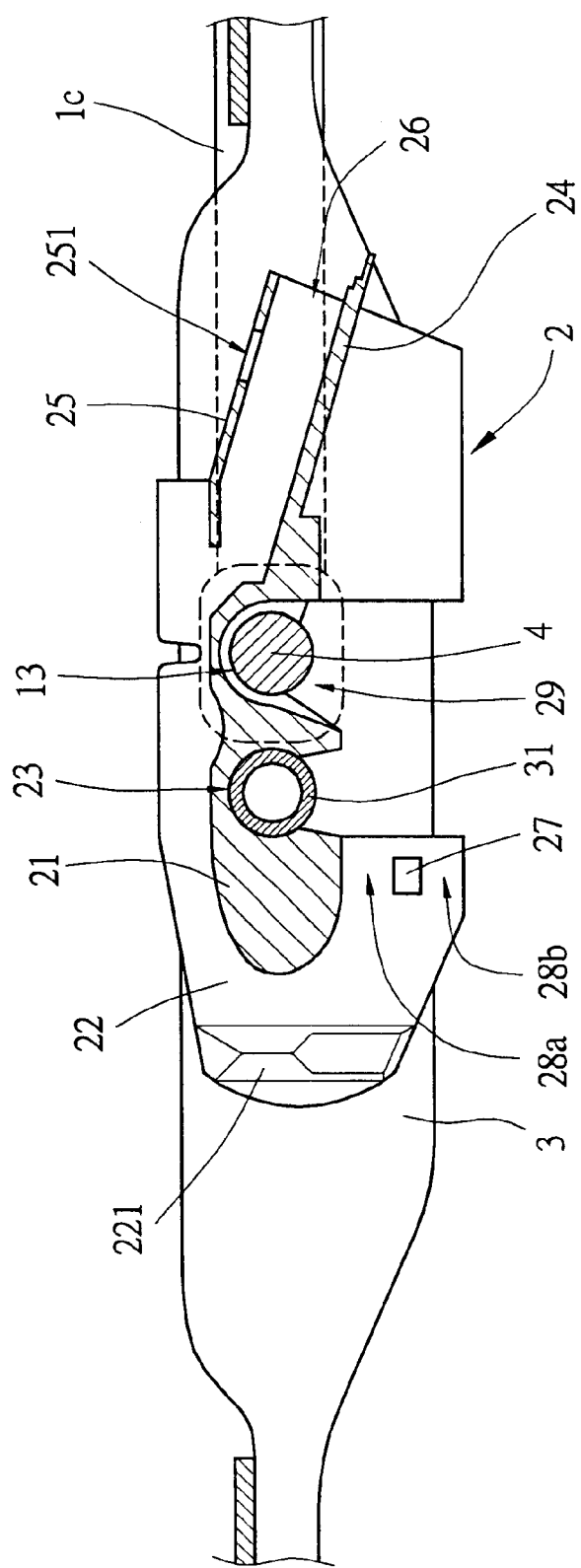
FIG. 7 is a cutaway view figure of an awing bar through an active bolt by the invention connector.

In addition, referring to FIG. 7, there is an arced inserting slot 29 below the arced transverse part 21, with which the bolt 4 can be set through the two opposite holes 32 of the wiper framework 3 to fix the connector 2 while the pin hole 13 of the wiper arm 1c which is inserted into the rear portion of the connector 2 is located with respect to the arced inserting slot 29. In this way, the present connector 2 can further suitable the pin-end type wiper arm.

According to above-mentioned structure, because the present connector 2 has the socket 26, inner fastening slot 28a, outer fastening slot 28b, and arced inserting slot 29, it can match the flat-end wiper arm 1a, the hook-end wiper arm 1b and the pin-end wiper arm 1c. Therefore, the connector of the present invention has great flexibilities for use. For production, this invention can help to reduce cost, so it can also help to improve the market competition. On the other hand, it is very convenient for user to have only one type of connector suitable for many different windshield wiper arms for maintenance.

Figure 8:
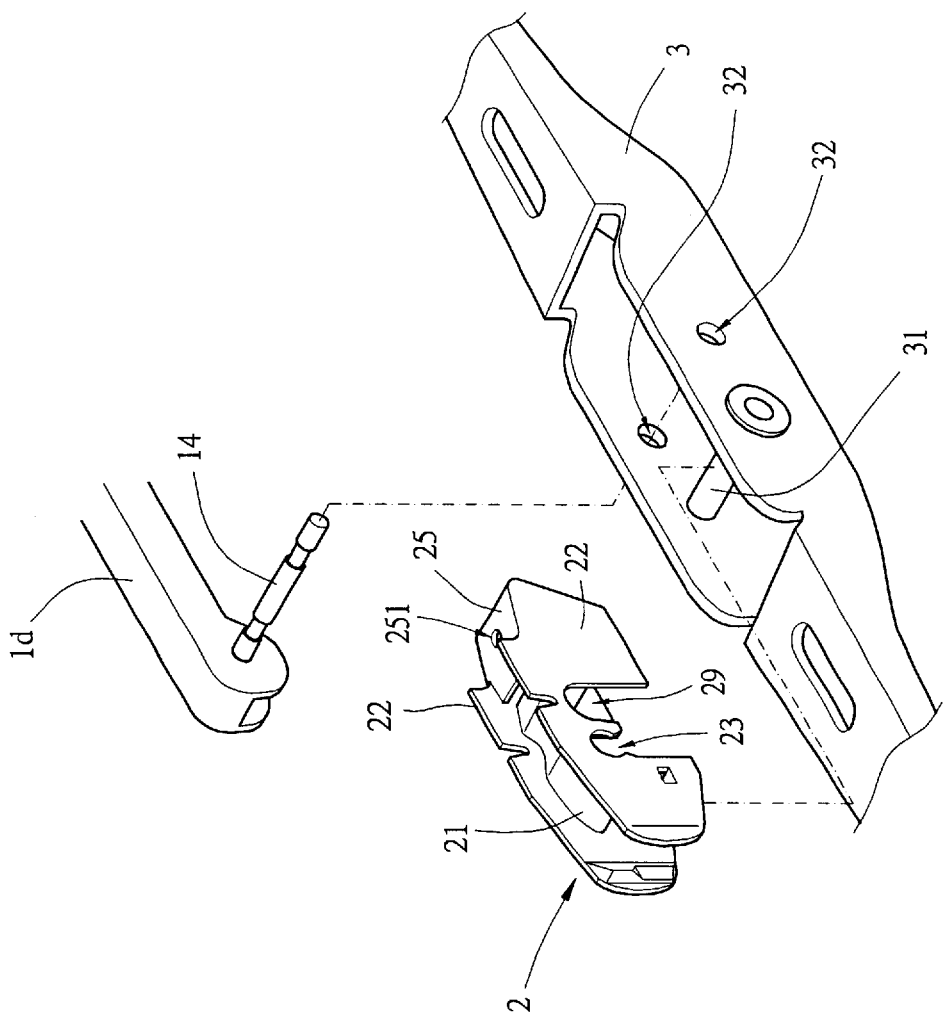
FIG. 8 is a disassembled Figure of a swing bar with bolts by the invention connector.
Figure 9:
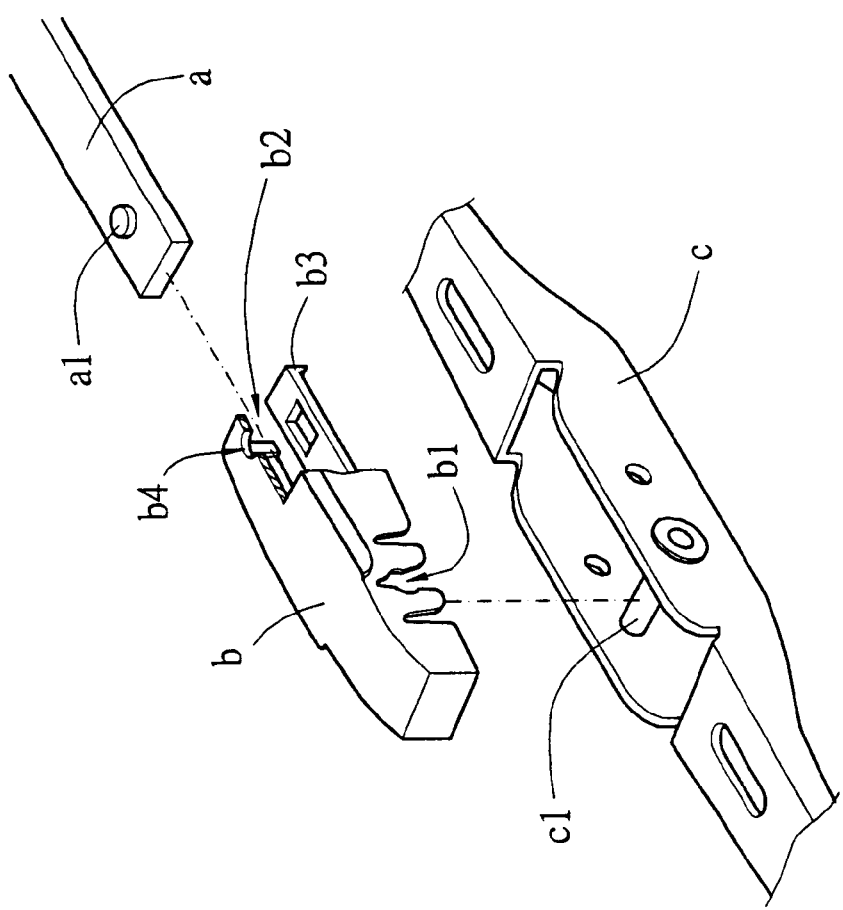
FIG. 9 is a disassembled Figure of a flat swing bar by a traditional connector.
Figure 10:
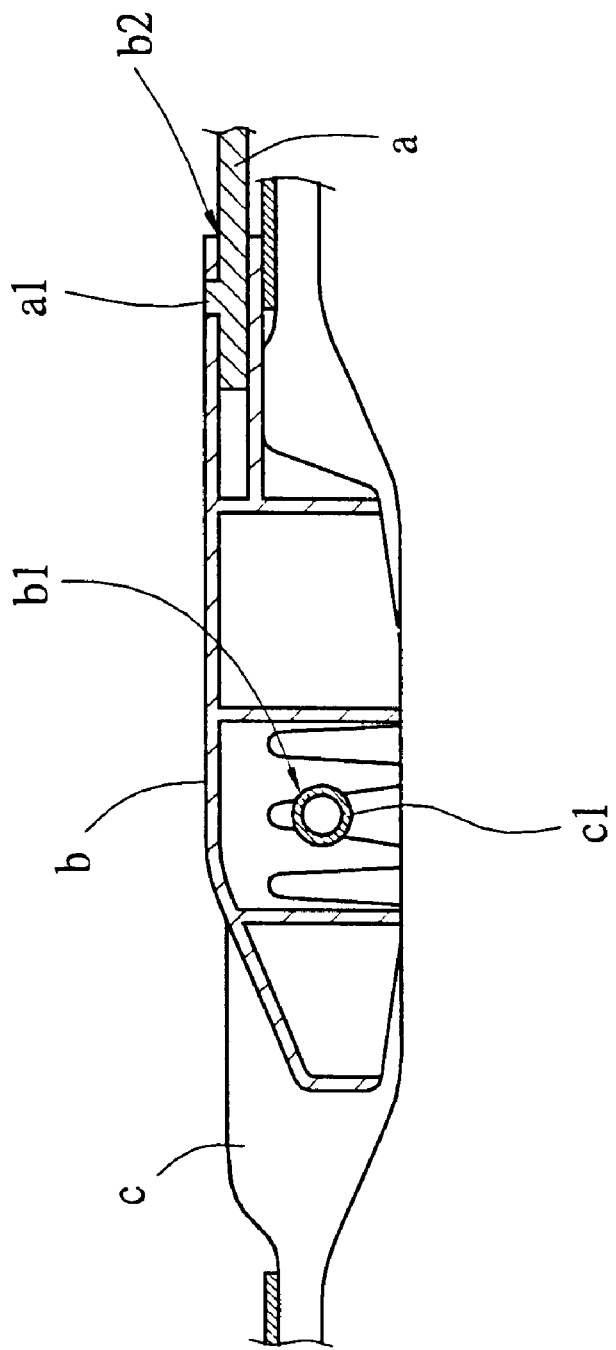
FIG. 10 is a cutaway view figure of a flat swing bar by a traditional connector.
Figure 11:
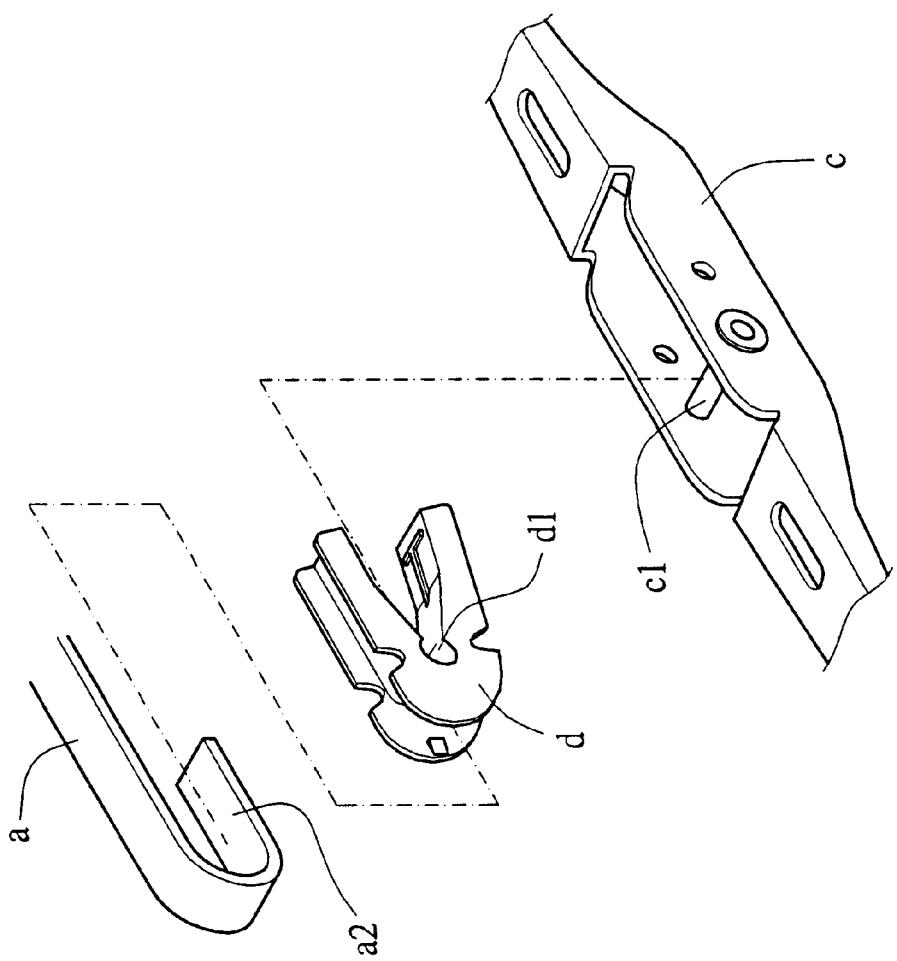
FIG. 11 is a disassembled view figure of a swing bar with a hook end by the inner fastening slot of the traditional Connector.
Figure 12:
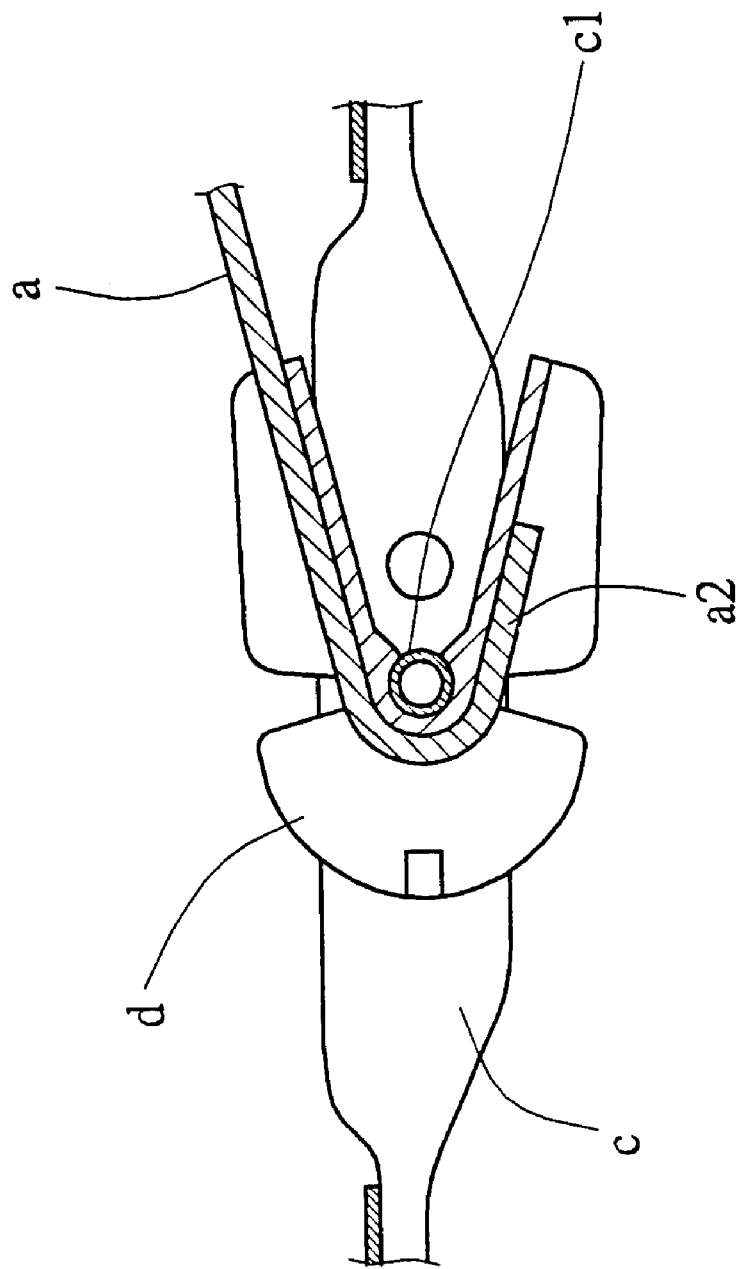
FIG. 12 is a partial sectional figure of a flat swing bar by a traditional connector.
Figure 13:
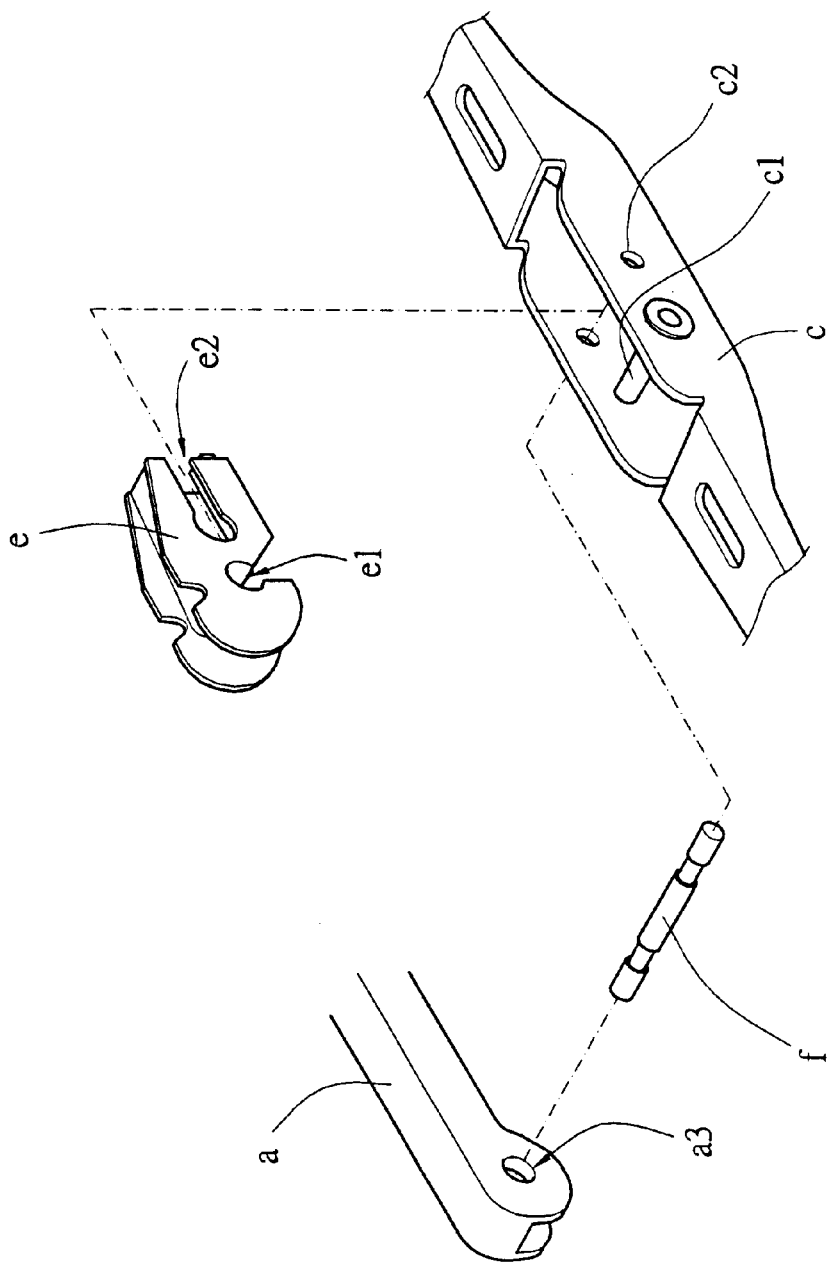
FIG. 13 is a disassembled view figure of an awing bar through an active bolt by a traditional connector.
Figure 14:
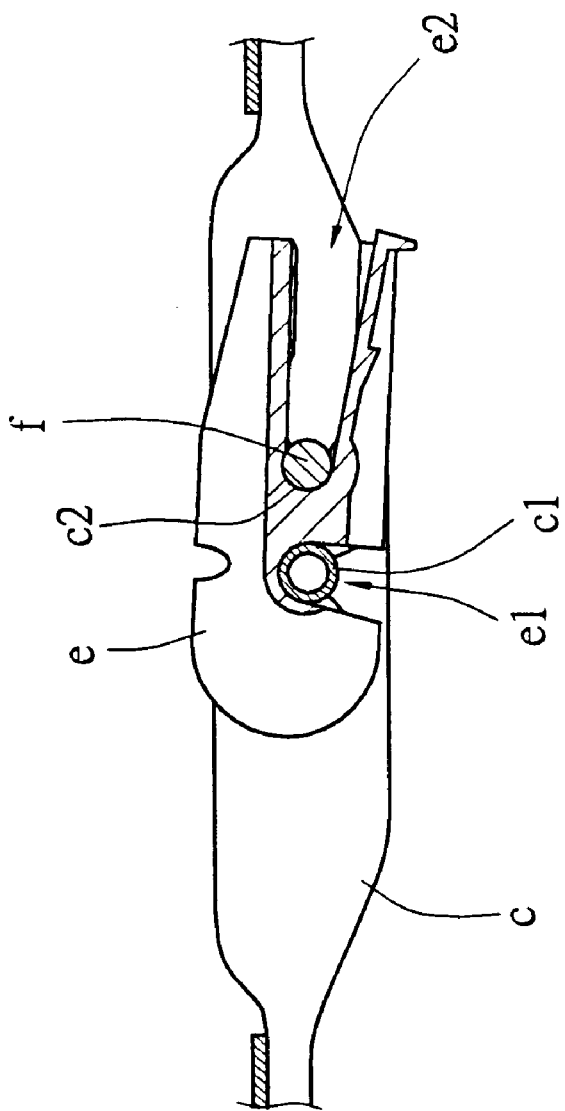
FIG. 14 is a sectional figure of an awing bar through an active bolt by a traditional connector.

Finally, please refer to FIG. 8 of another preferred embodiment, the bolt 14 is fixed in the pin hole of the wiper arm 1d, so the wiper arm 1d with the bolt 14 can be directly get through the socket 32. Therefore, after the arced injecting slot 29 of the connector 2 is fastened to the bolt 14, the wiper arm 1d is connect to the connector 2.

What is claimed is:

1. A windshield wiper arm connector, comprising:

an arc-shaped transverse part, a first fastening slot being formed in a lower portion of said arc-shaped transverse part, said first fastening slot being adapted to receive a connecting shaft of a windshield wiper arm, said arc-shaped transverse part further having an arced inserting slot in the lower portion thereof, the arced inserting slot receiving a pin therein for fastening said arc-shaped transverse part to the pin, so as to fix a pin-type wiper arm to the connector;

first and second side sheets disposed on opposite sides of said arc-shaped transverse part;

a spring slice formed on a rear side of said arc-shaped transverse part, and being located between said first and second side sheets;

a structure slice disposed between said first and second side sheets and above said spring slice, said structure slice having a positioning hole therein, said structure slice and said spring slice forming a socket therebetween for receiving a flat-end type wiper arm therein, wherein when the flat-end type wiper arm is received within the socket, a projecting point of the flat-end type wiper arm is receivable within the positioning hole to fix the flat-end type wiper arm in the connector;

first and second projecting blocks, each being disposed below said arc-shaped transverse part in a region in front of the first fastening slot, and each being attached to an inner side of a respective one of said side sheets, said first and second projecting blocks and said arc-shaped transverse part forming an inner fastening slot therebetween, a region outside of said first and second projecting blocks defining an outer fastening slot;

first and second baffle slices, each being disposed in front of a respective projecting block and in front of said arc-shaped transverse part, and each being attached to the inner side of a respective one of said side sheets, wherein a first sized hook-end type wiper arm is attachable to the connector by disposing a free leg of the hook-end type wiper arm in the inner fastening slot, and a second sized hook-end type wiper arm is attachable to the connector by disposing a free leg of the second sized hook-end wiper arm in the outer fastening slot, and wherein said baffle slices abut against an outer surface of a curved portion of the respective hook-end type wiper arm, and said arc-shaped transverse part abuts against an inner surface of the curved portion of the respective hook-end wiper arm, when said first sized hook-end type wiper arm is attached to the connect or and when said second sized hook-end type wiper arm is attached to the connector, to fix the respective hook-end type wiper arm to the connector.

* * * * *